US005276956A

United States Patent [19]

Bertocchi

[11] Patent Number: 5,276,956

[45] Date of Patent: Jan. 11, 1994

[54] METHOD AND APPARATUS FOR ARRANGING AND INSERTING TERMINALS IN AN ELECTRICAL COMPONENT AND METHOD OF ASSEMBLING THE APPARATUS

[75] Inventor: Daniele Bertocchi, Ferrara, Italy

[73] Assignee: Axis, S.p.A., Tarvarnelle Val di Pesa, Italy

[21] Appl. No.: 908,039

[22] Filed: Jul. 6, 1992

Related U.S. Application Data

[63] Continuation of Ser. No. 651,603, Feb. 6, 1991, Pat. No. 5,153,982.

[30] Foreign Application Priority Data

Aug. 6, 1990 [IT] Italy .............................. 67617-A/90

[51] Int. Cl.$^5$ ...................... H02K 15/00; B23P 11/02; B23P 19/04; H01R 9/00

[52] U.S. Cl. ........................................ 29/596; 29/447; 29/460; 29/527.1; 29/732; 29/759; 29/842

[58] Field of Search ................. 29/596, 732, 739, 759, 29/842, 29/845, 884, 527.1, 227/107; 29/447, 29/460; 227/107

[56] References Cited

U.S. PATENT DOCUMENTS

| | | | |
|---|---|---|---|
| 2,814,802 | 12/1957 | Maximoff | 1/2 |
| 2,970,370 | 2/1961 | Weaver et al. | 29/203 |
| 3,067,902 | 12/1962 | Maximoff et al. | 218/0.5 |
| 3,566,464 | 3/1971 | Bakermans | 29/625 |
| 3,574,935 | 4/1971 | Berg | 29/625 |
| 3,812,569 | 5/1974 | Kufner et al. | 29/203 B |
| 3,984,908 | 10/1976 | Ackley | 29/205 D |
| 4,043,033 | 8/1977 | Yeo | 29/739 |
| 4,386,464 | 6/1983 | Yanai et al. | 29/834 |
| 4,433,476 | 2/1984 | Bailey et al. | 29/752 |

OTHER PUBLICATIONS

Payne, P., "Automatic Pin Inserter," *IBM Technical Disclosure Bulletin*, vol. 26, No. 1, Jun. 1983, pp. 424–426.

*Primary Examiner*—P. W. Echols
*Attorney, Agent, or Firm*—Jeffrey H. Ingerman

[57] ABSTRACT

Apparatus for taking a plurality of terminals arranged in a first spatial configuration, and rearranging them into a second spatial configuration for insertion into a stator or other electrical component, is provided. The apparatus includes a plurality of tubes, one for each terminal, which convey the terminals to new locations and, if necessary, twist along the way to change the orientations of the terminals.

52 Claims, 8 Drawing Sheets

METHOD AND APPARATUS FOR ARRANGING AND INSERTING TERMINALS IN AN ELECTRICAL COMPONENT AND METHOD OF ASSEMBLING THE APPARATUS

CROSS REFERENCE TO RELATED APPLICATION

This application is a continuation of copending, commonly-assigned U.S. patent application Ser. No. 07/651,603, filed Feb. 6, 1991, now U.S. Pat. No. 5,153,982.

BACKGROUND OF THE INVENTION

This invention relates to machines for assembling terminals to electrical components, and especially electric motor components such as stators. More particularly, this invention relates to machines for arranging terminals for assembly onto electric motor stators.

With certain electrical components, and particularly wound electric motor components such as stators, it is necessary to apply a plurality of terminals to the component. In the case of a stator, for example, at least two terminals, for terminating at least two ends of a single winding, must be applied to the end of the stator or to a terminal board attached to the end of the stator. For stators with multiple windings, such as those for use in multi-speed motors, the number of terminals is correspondingly multiplied.

In addition, terminals are usually provided interconnected in strip form and are cut apart by the terminal applying apparatus. Thus the terminals are generally arranged linearly in the apparatus, reflecting their linear configuration before they are cut apart. However, the arrangement of the terminals on the electrical component is not necessarily linear. For example, a stator has a substantially annular end face. While it may be possible to arrange the terminals linearly on one side of the end face, or possibly on two parallel sides, as the number of terminals increases, it becomes more likely that a nonlinear arrangement of terminals will be required.

It has not heretofore been easy to apply terminals in nonlinear arrangements. Most known terminal applying machines fed one or two strips of terminals, allowing for one or two parallel rows of terminals in the final arrangement. In another known machine for applying terminals around the annular end face of a stator, the stator was held in a rotating arbor that was indexed to a new position after each terminal was applied. This added significantly to the time required to apply terminals to a stator, especially as compared to previously known machines for applying linear arrangements of terminals, in which all of the terminals could be driven into position at once.

In other known systems, the various terminals were positioned and oriented by a complicated lever system. However, the number of terminals that could be accommodated in such apparatus was limited, because the lever system became too complex if too many terminals were involved. In addition, such lever systems are generally too complex to allow adjustment of a single system for different arrangements of terminals.

It would be desirable to be able to provide apparatus for applying a plurality of terminals to an electrical component, such as a stator, particularly in nonlinear arrangements.

It would also be desirable to be able to provide such apparatus which could accommodate a plurality of arrangements of terminals.

SUMMARY OF THE INVENTION

It is an object of this invention to provide apparatus for applying a plurality of terminals to an electrical component, such as a stator, particularly in nonlinear arrangements.

It is also an object of this invention to provide such apparatus which can accommodate a plurality of arrangements of terminals.

In accordance with this invention, there is provided apparatus for inserting a plurality of terminals in an electrical component, where the plurality of terminals enters the apparatus in a first spatial configuration and is inserted in the electrical component in any second spatial configuration. The apparatus includes feeding means for feeding the plurality of terminals in the first spatial configuration, rearranging means for receiving the plurality of terminals in the first spatial configuration and rearranging them into the second spatial configuration, and receiving means in contact with the rearranging means and the electrical component for receiving the rearranged plurality of terminals in the second spatial configuration and passing the rearranged plurality of terminals to the electrical component. Driving means drives the plurality of terminals from the feeding means through the rearranging means and the receiving means, whence inserting means inserts the rearranged plurality of terminals into the electrical component. The rearranging means and the receiving means are removable and interchangeable, whereby any desired rearranging means, and any corresponding receiving means, for producing any desired second spatial configuration, can be inserted into the apparatus, such that the apparatus can produce any second spatial configuration.

Configuration adjustment apparatus including the rearranging means and the receiving means, for use with a terminal insertion machine, is also provided.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
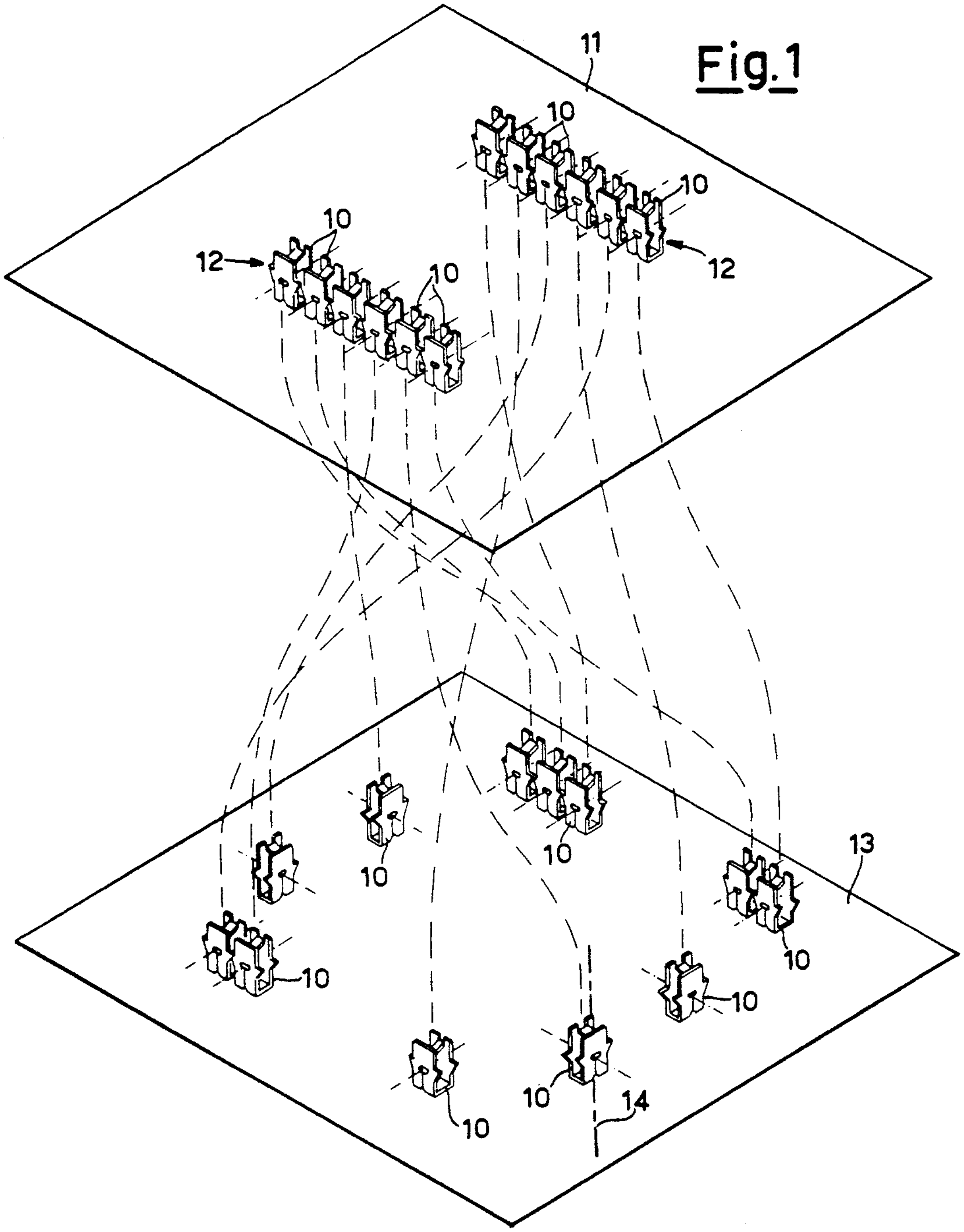
FIG. 1 is a schematic perspective view of first and second spatial configurations of terminals according to this invention.

The problem to be solved by the present invention is illustrated schematically in FIG. 1. As shown, terminals 10 are provided initially in a first spatial configuration in plane 11, all oriented identically and arranged in two parallel rows 12, although if fewer terminals are required, they can be arranged in a single row 12. An exemplary desired second spatial configuration of terminals 10 is shown in plane 13, although it is to be understood that the desired second spatial configuration could be any configuration.

Corresponding terminals 10 in planes 11, 13 are shown interconnected by broken lines. As can be seen, not only does the position of each terminal change as between plane 11 and plane 13, but the angular orientation of each terminal 10 about its vertical axis 14 may change as well.

Figure 2:
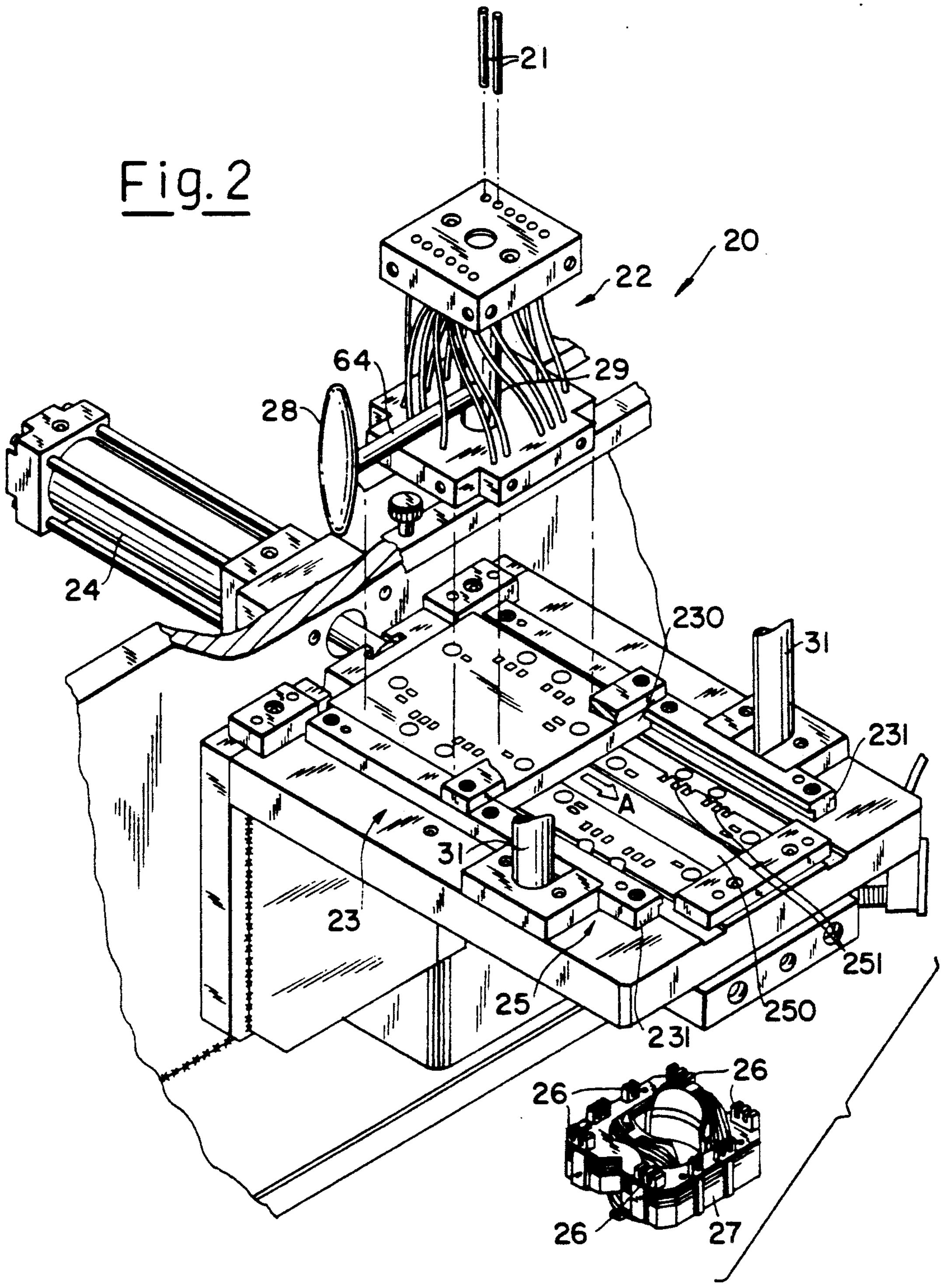
FIG. 2 is an exploded partially fragmentary perspective view of apparatus incorporating the present invention.
Figure 3:
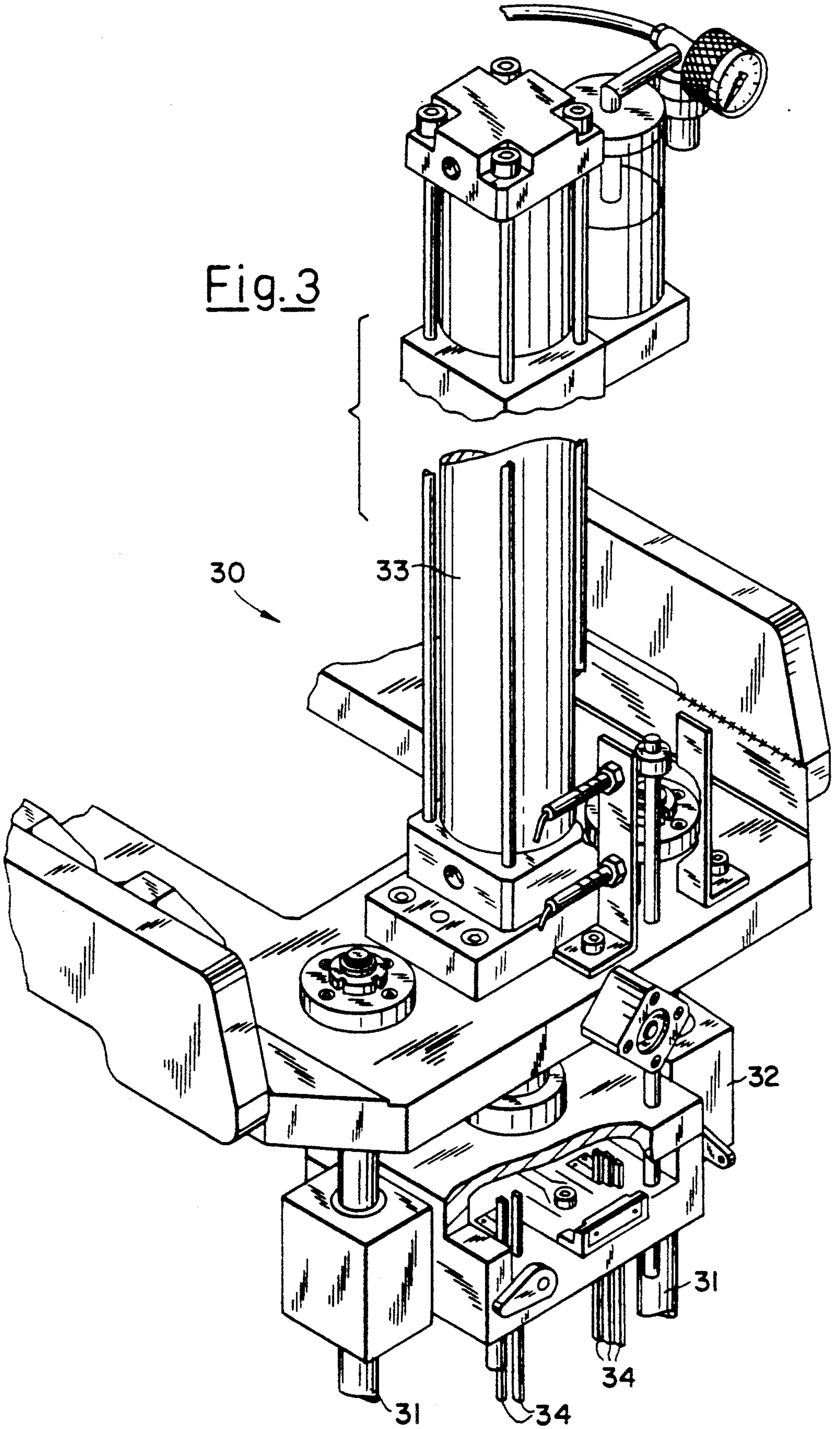
FIG. 3 is a perspective view of a ramming unit used with the invention.

Apparatus 20 incorporating a preferred embodiment of the present invention for rearranging terminals 10 is shown in FIG. 2. In accordance with the invention, terminals 10 are driven by pushers 21 through a rearranging stage 22, from which they emerge at station 23 in the desired second spatial configuration. The terminals are received in receiving plate 230 and plate 230 is translated between guides 231 in the direction of arrow A by means of cylinder 24, with the terminals in the same configuration, to station 25. There the terminals are rammed through mating passages 251 in plate 250 into terminal receptacles 26 on stator 27 (or other electrical component) by overhead ramming unit 30 of FIG. 3. Stator 27 is held in a suitable fixture (not shown). The wire ends of the various windings to be terminated may have already been inserted into receptacles 26 in the appropriate manner to assure a proper connection, or they may be inserted into terminals 10 later. In particular, if the component into which terminals 10 are being inserted is not a stator, but is instead a stator terminal board which will later be attached to a stator, there will be no wire ends to insert at this point.

Overhead ramming unit 30 is supported on apparatus 20 by columns 31. Trolley 32 is driven vertically on columns 31 by cylinder 33, and carries rigid cams 34 which push terminals 10 into receptacles 26. Cylinder 33 preferably operates in a two-stage downward motion. In the first stage it moves downward rapidly with little force, driving terminals 10 quickly towards receptacles 26. In the second stage it moves downward slowly and a very small distance with extremely high force, for securely ramming terminals 10 into receptacles 26. The action of trolley 32 may also actuate cutters (not shown) on the underside of plate 250 for trimming the excess ends of the windings once terminals 10 have been properly seated. Such cutters would be actuated at the very end of the second stage of the action of cylinder 33.

Figure 5:
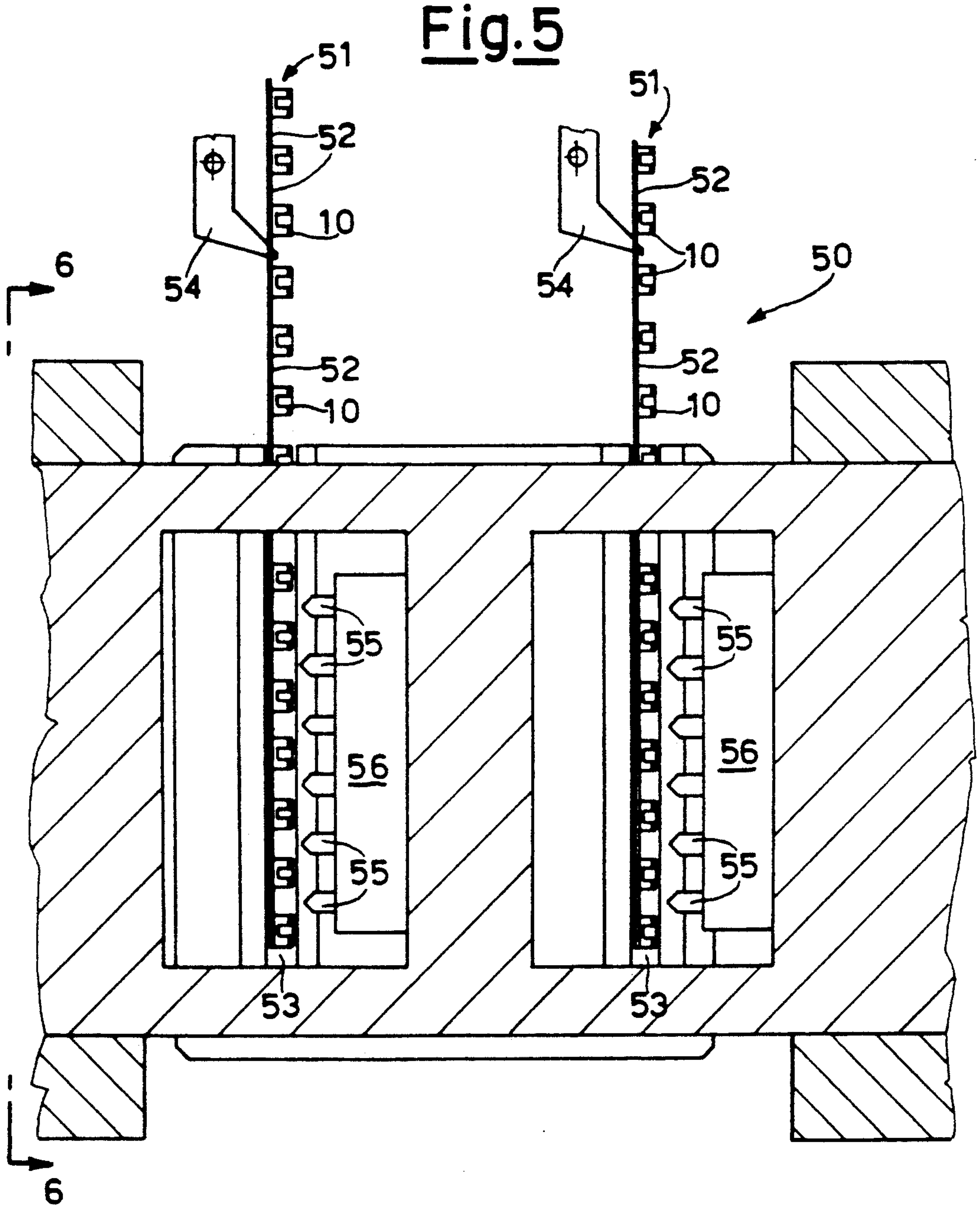
FIG. 5 is a fragmentary plan view of the apparatus incorporating the present invention, taken from line 5—5 of FIG. 4, showing the terminal feeding and cutting means.
Figure 6:
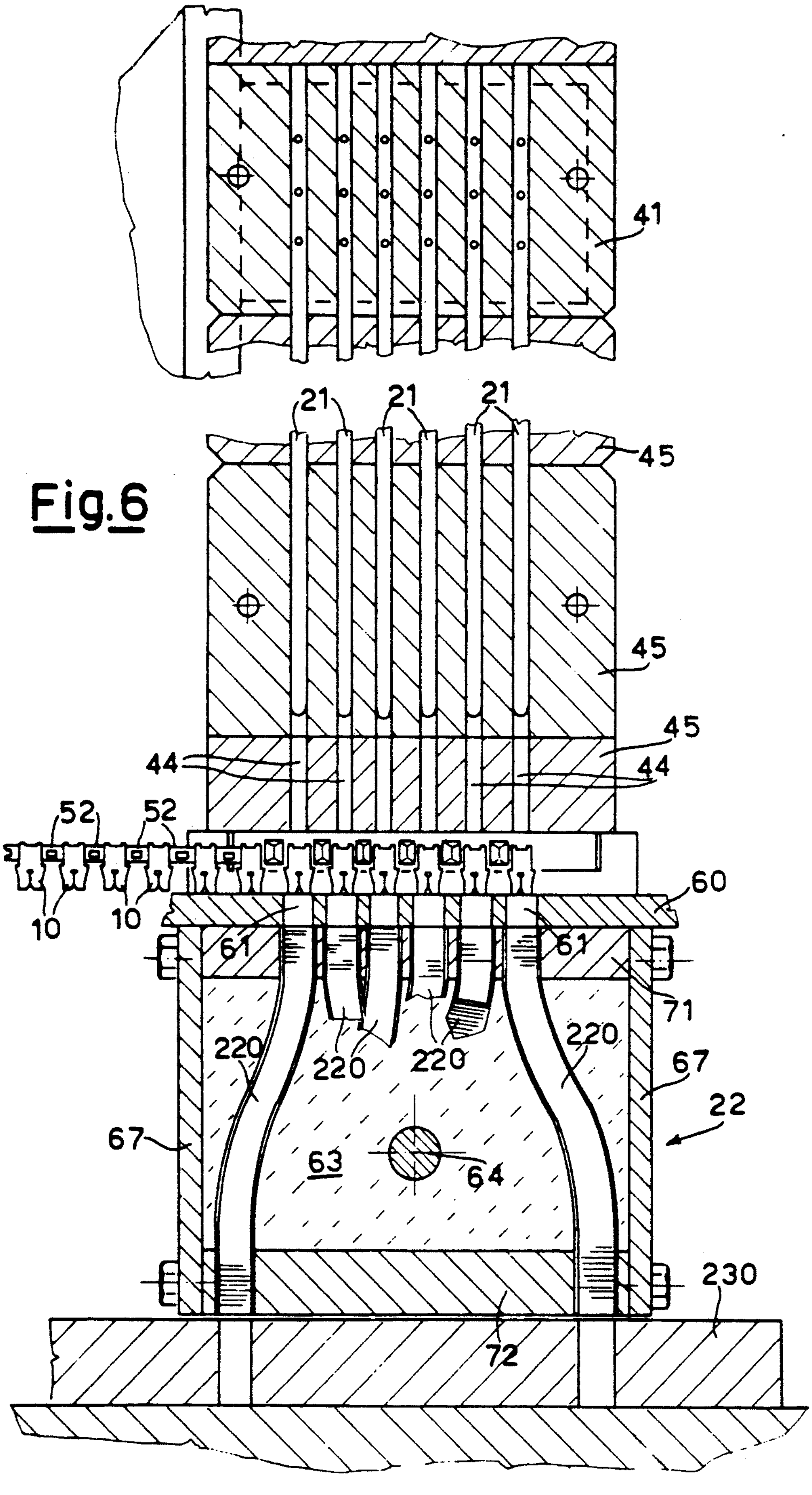
FIG. 6 is a fragmentary vertical cross-sectional view of the apparatus incorporating the present invention, taken from line 6—6 of FIG. 5.

Feed stage 50 of apparatus 20 is shown in FIGS. 5 and 6. Strips 51 of terminals 10, interconnected by intermediate portions 52, are fed into guides 53 by advancing units 54. Guides 53 rest above plate 60, which has mating passages 61 for receiving terminals 10. Cutters 55, rigidly mounted to carriers 56, sever intermediate portions 52 so that pushers 21 can push terminals 10 into passages 61. Intermediate portions 52 are then discarded. Of course, it may be possible to feed a series of unconnected terminals 10 into guides 53, properly spaced to register with passages 60, in which case cutters 55 would not be necessary, and there would be no need to dispose of intermediate portions 52.

Figures 7, 8:
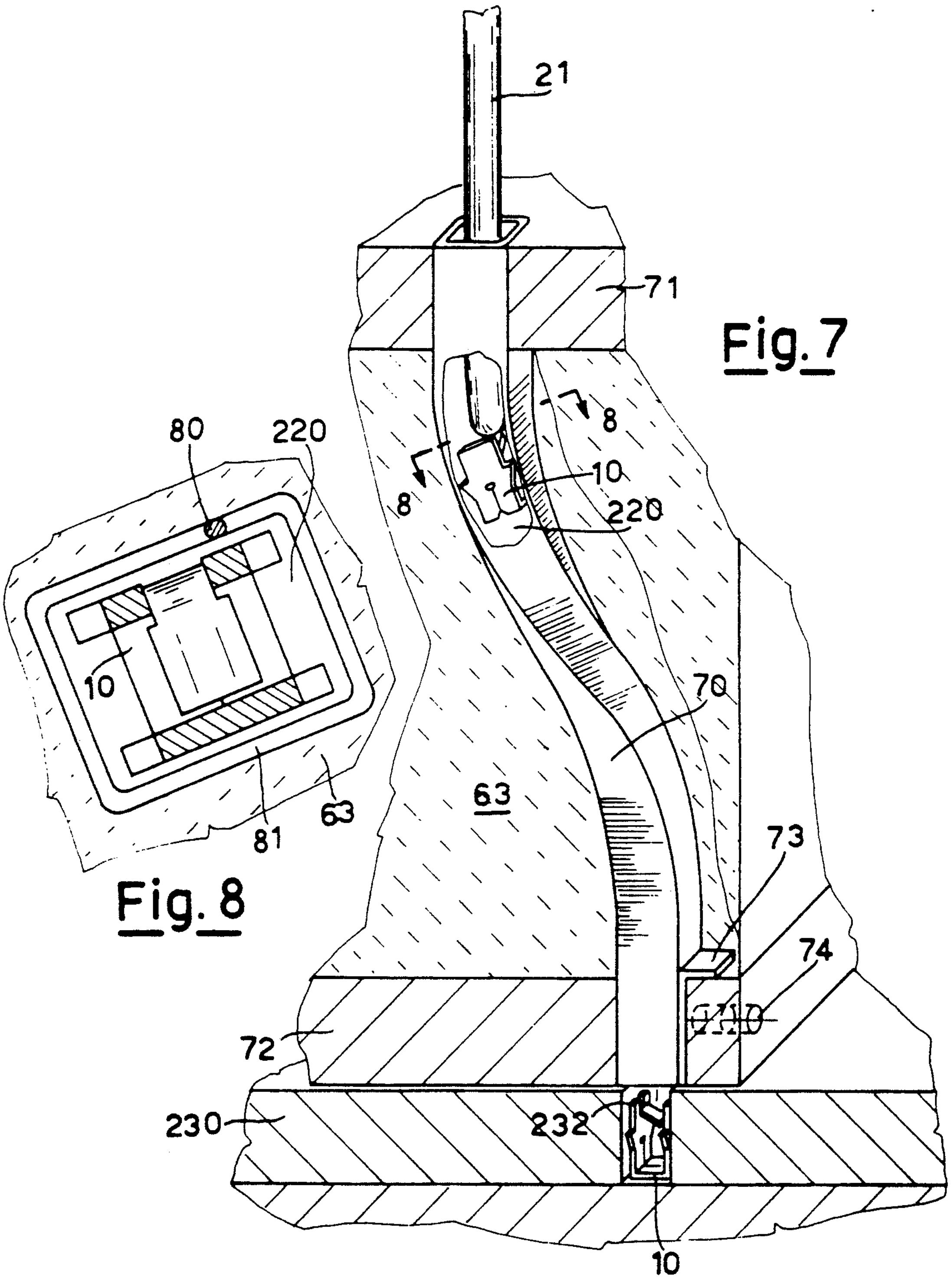
FIG. 7 is an enlarged fragmentary perspective view of apparatus according to the present invention, showing a terminal passage.
FIG. 8 is a cross-sectional view of the passage of FIG. 7, taken from line 8—8 of FIG. 7.

After pushers 21 push terminals 10 into passages 61, they continue to push terminals 10 into mating passages 220 of rearranging stage 22. An embodiment of rearranging stage 22, for cases where terminals 10 have a generally regular cross section in the direction perpendicular to the direction of travel through passages 220, is shown in more detail in FIGS. 7 and 8. A passage 220 is provided for each terminal 10 present in the desired configuration. Passages 220 are formed by tubes 70, having a cross section generally the same as that of terminal 10. Each tube 70 is anchored to top plate 71 of rearranging stage 22 and to bottom plate 72 of rearranging stage 22. At plate 71, each passage 220 registers with a corresponding passage 61 of plate 60. By providing an appropriate length of tube 70, each passage 220 can be brought to a desired point on plate 72, in registry with a passage 232 in receiving, or transfer, plate 230. Passages 232 have the same cross sections as tubes 70, and locations and orientations in accordance with the desired second configuration. Not only can the location of terminal 10 in the horizontal plane be changed, but by twisting tube 70, as shown in FIG. 7, its orientation about its axis 14 can be changed. The rate of twist cannot be too great, however, in order to prevent jamming of terminal 10 in tube 70 as it passes through. A flange 73 and screw or other fastener 74 are provided to secure tube 70 to plate 72 against the restoring forces that would tend to dislodge it.

Tubes 70 must be sufficiently flexible and strong to be twisted and bent to bring terminals 10 to their desired locations. They must also have smooth interior surface to avoid catching the edges of terminals 10. In a preferred embodiment for use with terminals of regular, convex cross section, tubes 70 are wound from wire 80 around an appropriately shaped mandrel. To maintain a smooth interior surface, each turn 81 of wire 80 must touch its neighboring turns. Therefore, wire 80 is preferably plastically deformed as it is wound, to overcome any elastic restoring forces that might tend to separate the turns 81. Proper choice of the wire material and dimensions, and the degree of plastic deformation, will impart the necessary flexibility to tubes 70.

It is also preferable to encase tubes 70 in heat shrinkable sleeves, which are heated after tubes 70 have been placed in their desired positions, fixing them rigidly. This rigidity prevents tubes 70 from moving during terminal insertion. Greater rigidity can be achieved by enclosing entire rearranging stage 22 in walls 62 and filling the interior between tubes 70 with a resinous or other hardening material 63.

Rearranging stage 22 is intended to be removable from apparatus 20 so that other rearranging stages 22, producing other configurations of terminals 10, can be inserted in its place. To facilitate the removal of rearranging stage 10, a handle 28 projects from rearranging stage 22 on arm 64, which is itself fixed to post 29 which also interconnects plates 71, 72 and keeps them at their predetermined separation distance. Handle 28 is particularly useful if rearranging stage 22 is provided with walls 67.

Thus, in order to change the second, or output, configuration of terminals 10, one simply removes rearranging stage 22 (using handle 28 where provided), as well as receiving or transfer plate 230, and replaces them with an appropriate other rearranging stage 22 and plate 230.

Pushers 21 according to the invention must be sufficiently strong to advance terminals 10 through tubes 70 without buckling. However, they must also be able to deform as tube 70 twists and turns. Similarly, they must have a low coefficient of friction to avoid both excessive wear and binding at turns in tubes 70. One preferred material that meets these requirements is polytetrafluoroethylene (PTFE), better known by the TEFLON® trademark under which it is sold.

Figure 4:
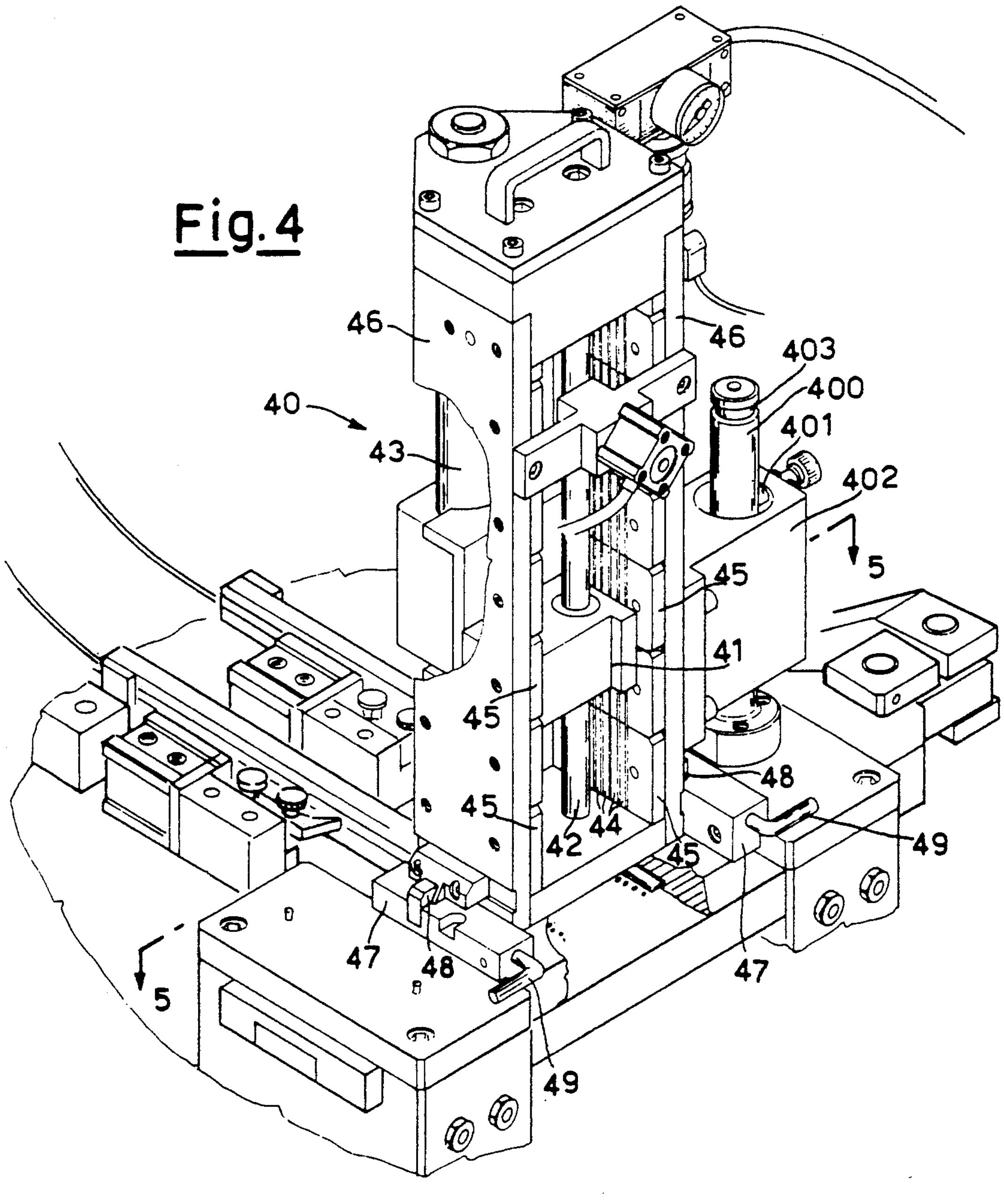
FIG. 4 is a fragmentary perspective view of a portion of the apparatus used with this invention, showing the driving means.

Apparatus 40 for moving pushers 21 is shown in detail in FIG. 4. Pushers 21 are driven by slide 41, which moves along two posts 42 (only one shown) under the action of cylinder 43. Pushers 21 are guided in channels 44 milled into plates 45 supported by side walls 46. Plates 45 are preferably brass.

Apparatus 40 is supported above feed stage 50 on side blocks 47, to which it is locked by teeth 48. If access to feed stage 50 is required, handles 49 can be used to release teeth 48, allowing apparatus 40 to be raised on column 400 until tooth 401 of support sleeve 402 engages slot 403 on column 400, at which time apparatus 40 can be pivoted out of the way about column 400.

Figure 11:
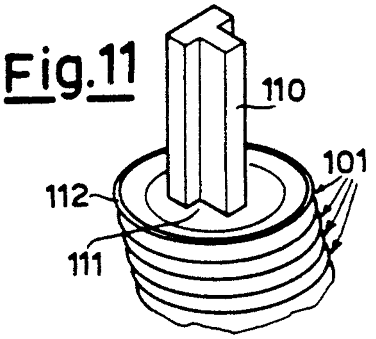
FIG. 11 is a fragmentary perspective view showing the construction of the passage of FIGS. 9 and 10.
Figure 10:
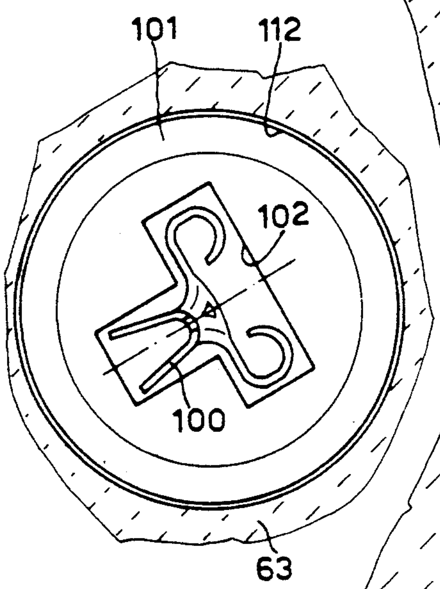
FIG. 10 is a cross-sectional view, similar to FIG. 8, of the passage of FIG. 9, taken from line 10—10 of FIG. 9.
Figure 9:
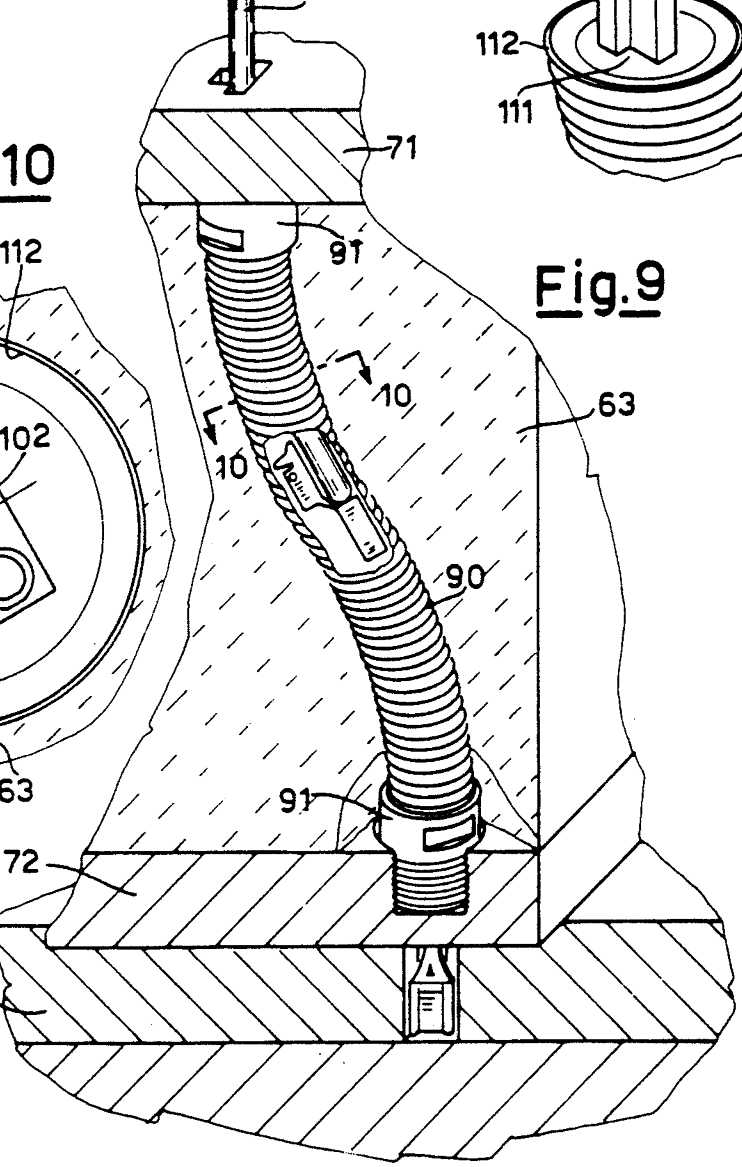
FIG. 9 is a view similar to FIG. 7 of an alternate embodiment of the invention.

An alternative embodiment for the construction of rearrangement passages 220 is shown in FIGS. 9-11. This alternative construction is particularly useful with terminals 100 having concave or irregular cross sections, but can be used for terminals of any cross section. Tubes 90 are formed by using disks 101 into which are punched holes 102 of appropriate cross section. Disks 101 are also punched in such a way as to be slightly concave.

A flexible mandrel 110 of the same cross section as holes 102 is bent to match the desired trajectory of tube 90. Disks 101 are then arranged on mandrel 110 with their concavities in alternating directions, so that each disk 100 touches one neighboring disk 101 in the center 111, and another neighboring disk 101 at rim 112, so that they are spaced apart from one another.

Completed tubes 90 can then be inserted into rearranging stage 22 in the same manner as tubes 70, except that preferably a different type of fitting 91 is used to attach tubes 90 to plates 71, 72. The spaces between disks 101 are then filled with a resinous or other hardening material similar to resin 63, in a manner similar to that described above in connection with tubes 70. Specifically, the entire rearranging stage could be encased in walls 67 and the interior could be filled with material 63, which would fill the spaced between disks 101 as well. After the resin has hardened mandrel 110 is withdrawn. Mandrel 110 is preferably made from a material that does not stick to whatever material is used to fill the spaces between disks 101.

Thus it is seen that apparatus for applying a plurality of terminals to an electrical component, such as a stator, particularly in nonlinear arrangements, which apparatus can accommodate a plurality of arrangements of terminals, is provided. One skilled in the art will appreciate that the present invention can be practiced by other than the described embodiments, which are presented for purposes of illustration and not of limitation, and the present invention is limited only by the claims which follow.

What is claimed is:

1. Configuration adjustment apparatus for use in a machine for inserting a plurality of terminals in an electrical component, said plurality of terminals entering said machine in a first spatial configuration and being inserted in said electrical component in any one of a plurality of second spatial configurations, said machine comprising feeding means for feeding said plurality of terminals in said first spatial configuration, driving means for driving said plurality of terminals from said feeding means, and inserting means for inserting said plurality of terminals into said electrical component, said configuration adjustment apparatus comprising:

a plurality of rearranging means for receiving said plurality of terminals in said first spatial configuration, each one of said plurality of rearranging means (a) rearranging said plurality of terminals into one of said plurality of second spatial configuration configurations, and (b) comprising a plurality of tubular passages corresponding in number to said plurality of terminals, said passages having entrance ends arranged in said first spatial configuration and exit ends arranged in one of said plurality of second spatial configurations, each of said tubular passages including (i) a flexible tube and (ii) means for rigidifying said flexible tube; and a plurality of receiving means, corresponding in number to said plurality of rearranging means, each of said plurality of receiving means receiving said plurality of terminals in one of said plurality of second spatial configurations and passing said plurality of terminals to said electrical component; wherein said rearranging means are removable from said machine and interchangeably with other said rearranging means;

said receiving means are removable from said machine and interchangeable with other said receiving means; and any desired rearranging means, and its corresponding receiving means, for producing any desired one of said plurality of second spatial configurations, can be inserted into said machine; whereby:

said machine can produce any one of said plurality of second spatial configurations.

2. The apparatus of claim 1 wherein each said rearranging means is for a different desired second spatial configuration.

3. The apparatus of claim 1 wherein at least one of said first and second spatial configurations is planar.

4. The apparatus of claim 1 wherein each of said passages has a cross section corresponding to the terminal cross section.

5. The apparatus of claim 4 wherein:

each of said plurality of second spatial configurations is defined by relative locations of said terminals and by angular orientation of said terminal cross sections in said locations;

said passages are configured with said exit ends in said locations; and each of said exit ends is angularly oriented in accordance with the desired angular orientation of its respective terminal.

6. The apparatus of claim 1 wherein:

each of said plurality of receiving means comprises a plate having a number of receiving channels corresponding to said plurality of terminals; and said receiving channels are positioned in accordance with one of said plurality of second spatial configurations.

7. The apparatus of claim 6 wherein:

each of said plurality of receiving means comprises a plate having a number of receiving channels corresponding to said plurality of terminals; and when one of said plurality of rearranging means and a corresponding one of said plurality of receiving means are inserted into said apparatus, said receiving channels are aligned with said exit ends of said passages.

8. The apparatus of claim 1 wherein said means for rigidifying said flexible tubes comprises a hardened material encasing said tubes.

9. The apparatus of claim 1 wherein said means for rigidifying said plurality of tubes comprises a plurality of shrinkable sleeves, each respective shrinkable sleeve being shrunk about a respective tube.

10. A method of making a tubular passage for use in transporting terminals for electrical components from a first location to a second location along a desired trajectory, said method comprising the steps of:

providing a flexible tube having entrance and exit ends;

anchoring said entrance end of said flexible tube at said first location where said terminals will enter said tubular passage;

flexing said flexible tube to align said flexible tube along said trajectory;

anchoring said exit end at said second location where said terminals will exit said tubular passage; and rigidifying said tube.

11. The method of claim 10 wherein said rigidifying step comprises encasing said tube in a rigid sleeve.

12. The method of claim 11 wherein said encasing step comprises surrounding said tube with a shrinkable sleeve and shrinking said shrinkable sleeve to form said rigid sleeve.

13. The method of claim 12 wherein said surrounding step comprises surrounding said tube with a heat-shrinkable sleeve and said shrinking step comprises heating said sleeve.

14. The method of claim 10 wherein said rigidifying step comprises encasing said tube in a rigid mass.

15. The method of claim 14 wherein said encasing step comprises depositing a non-hardened resinous material about said tube and allowing said resinous material to harden.

16. The method of claim 10 wherein said step of providing a flexible tube comprises winding a tube from flexible wire.

17. The method of claim 16 wherein said winding step comprises winding said tube so that each turn of said wire touches adjacent turns, to provide a smooth interior surface for passage of said terminals.

18. The method of claim 16 wherein said winding step comprises plastically deforming said wire for minimizing elastic restoring forces tending to unwind said tube.

19. The method of claim 10 wherein said steps of providing a flexible tube and flexing said tube to align it along said trajectory comprise:

providing a flexible mandrel having a mandrel cross section;

aligning said flexible mandrel along said trajectory;

providing a plurality of disks having holes therein, said holes being at least as large as said mandrel cross section;

arranging said plurality of disks along said aligned mandrel;

fixing said disks in place; and removing said mandrel.

20. The method of claim 19 wherein said disks are concave and said arranging step comprises arranging said disks along said mandrel with alternating concavities, whereby consecutive ones of said disks touch only at one of (a) centers of said disks and (b) edges of said disks.

21. The method of claim 20 wherein said fixing and rigidifying steps comprise encasing said disks in a rigid mass.

22. The method of claim 21 wherein said encasing step comprises depositing a non-hardened resinous material about said disks and allowing said resinous material to harden.

23. The method of claim 19 wherein said fixing and rigidifying steps comprise encasing said disks in a rigid mass.

24. The method of claim 23 wherein said encasing step comprises depositing a non-hardened resinous material about said disks and allowing said resinous material to harden.

25. The method of claim 19 wherein said mandrel providing step comprises providing a mandrel having a mandrel cross section substantially similar to the terminal cross section, and said disk providing step comprises providing a plurality of disks having holes therein, each of said holes having a hole cross section substantially identical to said mandrel cross section, whereby said tubular passage has a passage cross section substantially identical to said terminal cross section.

26. The method of claim 25 wherein, when said terminal cross section of each of said terminals to be transported is to be arranged in a first orientation at said first location and in a second orientation at said second location, said anchoring steps comprise anchoring said entrance end such that said passage cross section at said entrance end is in said first orientation and anchoring said exit end such that said passage cross section at said exit end is in said second orientation.

27. The method of claim 10 further comprises, when (a) at least one of said terminals is to be positioned in a first spatial orientation in said first location and is to be inserted in said electrical component in a second spatial orientation in said second location, and (b) said terminal has an axis along said trajectory and has an external surface defining a cross section substantially perpendicular to said axis, the steps of:

providing in said tube an internal surface corresponding to said external surface of said terminal and defining a passage through said tube having a cross section corresponding to said terminal cross section, for guiding said external surface as said terminal moves along substantially the entire length of said trajectory to prevent free rotation of said terminal about said axis, and for rotating said terminal by a desired angular amount as said terminal moves along said trajectory; whereby:

said terminal is positioned in said second spatial orientation at the end of said trajectory.

28. The method of claim 27 further comprising providing a terminal receiving seat for receiving said terminal at the end of said trajectory.

29. The method of claim 28 further comprising aligning said terminal receiving seat in said second spatial orientation with a corresponding seat in said electrical component by moving said terminal receiving seat until it is aligned with said corresponding seat.

30. The method of claim 27 further comprising twisting said tube into a desired rotational configuration during said flexing step, to shape desired portions of said interior surface for guiding said terminal.

31. A method of making a rearranging means for receiving a plurality of electrical terminals in a first spatial configuration, and rearranging said plurality of terminals into a second spatial configuration, said method comprising the steps of:

providing a plurality of flexible tubes corresponding in number to said plurality of terminals, each of said tubes having an entrance end and an exit end;

arranging said entrance ends in said first spatial configuration and arranging said exit ends in said second spatial configuration; and rigidifying said tubes to form tubular passages.

32. The method of claim 31 wherein said step of providing a plurality of tubes comprises providing tubes having cross section corresponding to the terminal cross sections.

33. The method of claim 32 wherein said second spatial configuration is defined by relative locations of said terminals and by angular orientations of said terminal cross sections in said locations, and said step of arranging said exit ends comprises the steps of:

configuring said tubes with said exit ends in said locations; and angularly orienting each of said exit ends in accordance with the desired angular orientation of its respective terminal.

34. The method of claim 31 wherein said rigidifying step comprises encasing each of said tubes in a rigid sleeve.

35. The method of claim 34 wherein said encasing step comprises surrounding each of said tubes with a shrinkable sleeve and shrinking said shrinkable sleeve to form said rigid sleeve.

36. The method of claim 35 wherein said surrounding step comprises surrounding each of said tubes with a heat-shrinkable sleeve and said shrinking step comprises heating said sleeve.

37. The method of claim 31 wherein said rigidifying step comprises encasing each of said tubes in a rigid mass.

38. The method of claim 37 wherein said encasing step comprises depositing a non-hardened resinous material about each of said tubes and allowing said resinous material to harden.

39. The method of claim 37 wherein said encasing step comprises encasing all of said tubes in a single rigid mass.

40. The method of claim 39 wherein said encasing step comprises:

erecting walls about said rearranging device;

filling said device within said walls with a non-hardened resinous material; and allowing said resinous material to harden.

41. The method of claim 31 wherein:

each of said terminals is to be transported along a respective desired trajectory from a first location to a second location; and said arranging step comprises:

anchoring said entrance ends of said flexible tubes at said first locations where said terminals will enter said tubular passages, flexing said flexible tubes so that each of said flexible tubes aligns along a respective one of said trajectories, and anchoring said exit ends of said flexible tubes at said second locations where said terminals will exit said tubular passages.

42. The method of claim 41 wherein said step of providing flexible tubes comprises winding said tubes from flexible wire.

43. The method of claim 42 wherein said winding step comprises winding said tubes so that for each tube, each turn of said wire touches adjacent turns, to provide a smooth interior surface for passage of said terminals.

44. The method of claim 42 wherein said winding step comprises plastically deforming said wire for minimizing elastic restoring forces tending to unwind said tubes.

45. The method of claim 41 wherein said steps of providing flexible tubes and flexing said tubes to align each respective tube along said respective trajectory comprise, for each tube:

providing a flexible mandrel having a mandrel cross section;

aligning said flexible mandrel along said respective trajectory;

providing a plurality of disks having holes therein, said holes being at least as large as said mandrel cross section;

arranging said plurality of disks along said aligned mandrel;

fixing said disks in place; and removing said mandrel.

46. The method of claim 45 wherein said disks are concave and said step of arranging said disks comprises arranging said disks along said mandrel with alternating concavities, whereby consecutive ones of said disks touch only at one of (a) centers of said disks, and (b) edges of said disks.

47. The method of claim 46 wherein said fixing and rigidifying steps comprise encasing said disks in a rigid mass.

48. The method of claim 47 wherein said encasing step comprises depositing a non-hardened resinous material about said disks and allowing said resinous material to harden.

49. The method of claim 45 wherein said fixing and rigidifying steps comprise encasing said disks in a rigid mass.

50. The method of claim 49 wherein said encasing step comprises depositing a non-hardened resinous material about said disks and allowing said resinous material to harden.

51. The method of claim 45 wherein said mandrel providing step comprises providing a mandrel having a mandrel cross section substantially similar to the terminal cross section, and said disk providing step comprises providing a plurality of disks having holes therein, each of said holes having a hole cross section substantially identical to said mandrel cross section, whereby each said tubular passage has a passage cross section substantially identical to said terminal cross section.

52. The method of claim 51 wherein, when said terminal cross section of each of said terminals to be transported is to be arranged in a respective first orientation at said first location and in a respective second orientation at said second location, said anchoring steps comprise anchoring each respective one of said entrance ends such that each respective passage cross section at each respective entrance end is in said respective first orientation and anchoring each respective one of said exit ends such that each respective passage cross section at each respective exit end is in said respective second orientation.

* * * * *